United States Patent [19]
Borthomieu

[11] Patent Number: 5,735,913
[45] Date of Patent: Apr. 7, 1998

[54] NICKEL HYDROGEN STORAGE CELL

[75] Inventor: Yannick Borthomieu, Poitiers, France

[73] Assignee: SAFT, Romainville, France

[21] Appl. No.: 662,373

[22] Filed: Jun. 12, 1996

[30] Foreign Application Priority Data

Jun. 13, 1995 [FR] France .................. 95 06986

[51] Int. Cl.⁶ .................................. H01M 4/02
[52] U.S. Cl. ................ 29/623.1; 424/59; 424/101; 424/223
[58] Field of Search ............. 429/101, 59, 218, 429/223, 233; 29/623.1

[56] References Cited

FOREIGN PATENT DOCUMENTS

| | | |
|---|---|---|
| 0284333A3 | 2/1988 | European Pat. Off. . |
| 0284333 | 9/1988 | European Pat. Off. . |
| 0419220A1 | 3/1991 | European Pat. Off. . |
| 2611988A1 | 9/1988 | France . |
| WO9002423 | 3/1990 | WIPO . |
| WO9411910 | 5/1994 | WIPO . |

*Primary Examiner*—M. Nuzzolillo
*Attorney, Agent, or Firm*—Sughrue, Mion, Zinn, Macpeak & Seas, PLLC

[57] ABSTRACT

The present invention provides a nickel hydrogen storage cell including negative electrodes and positive electrodes in which the electrochemically active material containing a majority of nickel hydroxide is deposited electrochemically, and is located in the pores of a three-dimensional porous conductive support, wherein the ratio of the capacity of said positive electrodes over the capacity of said negative electrodes lies in the range 1.02 to 1.10, said active material of said positive electrodes being covered in cobalt hydroxide after impregnation.

4 Claims, 2 Drawing Sheets

NICKEL HYDROGEN STORAGE CELL

The present invention relates to a nickel hydrogen Ni—H$_2$ storage cell, and more particularly to the positive electrodes contained therein. It also extends to a method of manufacturing the positive electrode. Batteries containing this type of storage cell are used more particularly in space because of their high energy density per unit mass.

BACKGROUND OF THE INVENTION

A nickel hydrogen Ni—H$_2$ storage cell comprises a positive electrode containing an active material based on nickel hydroxide and derived from that used in a nickel cadmium Ni—Cd storage cell.

The conventional positive electrode for an Ni—Cd storage cell is constituted by a three-dimensional current collector, generally sintered nickel, containing the electrochemically active material in its pores. The active material is a hydroxide, mainly comprising nickel hydroxide but also containing smaller quantities of cobalt hydroxide, cadmium hydroxide, etc. These hydroxides are co-precipitated by chemically impregnating the collector from a solution of their salts. To improve the efficiency of the active material, it is then covered in a layer of cobalt hydroxide, with this operation being referred to as "post-cobalting".

The positive electrode of an Ni—H$_2$ storage cell generally includes an active material deposited by electrochemical impregnation (ECI). That method confers greater capacity to the active material than does chemical impregnation (CI). Attempts at further improving the efficiency of active material deposited by ECI by adding a post-cobalting operation have not succeeded. In spite of reliably obtaining an improvement of about 20% in the first cycle, the performance of the electrode is observed on subsequent cycles to revert to that of an electrode having no post-cobalting.

OBJECTS AND SUMMARY OF THE INVENTION

The present invention relates in particular to an Ni—H$_2$ storage cell containing positive electrodes of improved capacity compared with known electrodes, and of performance that remains stable throughout the storage cell is in use.

The present invention provides a nickel hydrogen Ni—H$_2$ storage cell including negative electrodes and positive electrodes whose electrochemically active material containing a majority of nickel hydroxide is electrochemically impregnated in the pores of a three-dimensional conductive support, wherein the ratio of the capacity of said positive electrodes over the capacity of said negative electrodes lies in the range 1.02 to 1.10, said active material of said positive electrodes being covered in cobalt hydroxide after impregnation.

Surprisingly, it has been observed that the invention makes it possible for the increase in capacity obtained by the operation of post-cobalting the positive electrodes to be conserved throughout the time during which the storage cell of the invention is in use. The essential characteristic of the present invention is combining a post-cobalted electrode which imparts greater capacity to the storage cell with excess positive capacity which enables this increased capacity to be conserved over time. The increase in capacity that can be measured during the first cycle is conserved only if the ratio of the capacity of the positive electrodes $C_p$ to the capacity of the negative electrodes $C_n$ is slightly greater than 1:

$$C_p/C_n = 1 + \epsilon$$

Thus, the negative electrode limits the duration of storage cell discharge because the hydrogen pressure in the storage cell becomes zero. In this way, the positive electrode is prevented from discharging completely and the voltage of the storage cell remains greater than 0.7 volts. The excess positive capacity is obtained by limiting the presence of hydrogen at the end of discharge.

Without the invention being limited thereto, one possible explanation for this surprising result may be the fact that the excess positive capacity prevents the chemically deposited coating of cobalt from being degraded during cycling of the storage cell. During deep discharge stages, the cobalt oxyhydroxide would otherwise run the risk of being reduced under the combined effects of high hydrogen pressure and low voltage. Such a situation corresponds to excess negative capacity, i.e. to circumstances where the ratio of positive electrode capacity over negative electrode capacity is less than 1.

For balanced operation of the electrodes, it is not desirable go too far from the value 1, it is therefore preferable to choose the lowest value of the ratio that enables a reliable result to be achieved. In the present case, given accumulated operational uncertainties, this value is about 1.02.

The present invention also provides a method of making a storage cell in which said cobalt hydroxide is deposited on said active material in application of the following steps:

a first step in which said electrode is immersed in a solution of cobalt salt and then dried and surface-rinsed in water; and a second step in which said electrode is immersed in a solution of caustic soda and then washed in water and dried.

The said cobalt salt is selected from the acetate, the nitrate, and the sulfate, and preferably cobalt acetate is used.

The present invention also provides a method of making a storage cell comprising the following steps prior to closing said storage cell:

with said positive electrodes being fully discharged, said storage cell is charged partially, e.g. a charge corresponding to 10% of the capacity of the storage cell; and a volume of hydrogen corresponding to the difference between the positive capacity and the negative capacity is allowed to escape from said storage cell, i.e. the desired positive excess, e.g. a volume equivalent to a pressure of one bar of hydrogen in the storage cell.

BRIEF DESCRIPTION OF THE DRAWINGS

The invention will be better understood, and other advantages and features will appear, on reading the following description of an embodiment given by way of non-limiting illustration and made with reference to the accompanying drawings, in which:

In FIGS. 3 and 4, voltage V is plotted up the ordinate and discharged capacity $C_d$ is plotted along the abscissa in ampere hours.

MORE DETAILED DESCRIPTION

Figure 1:
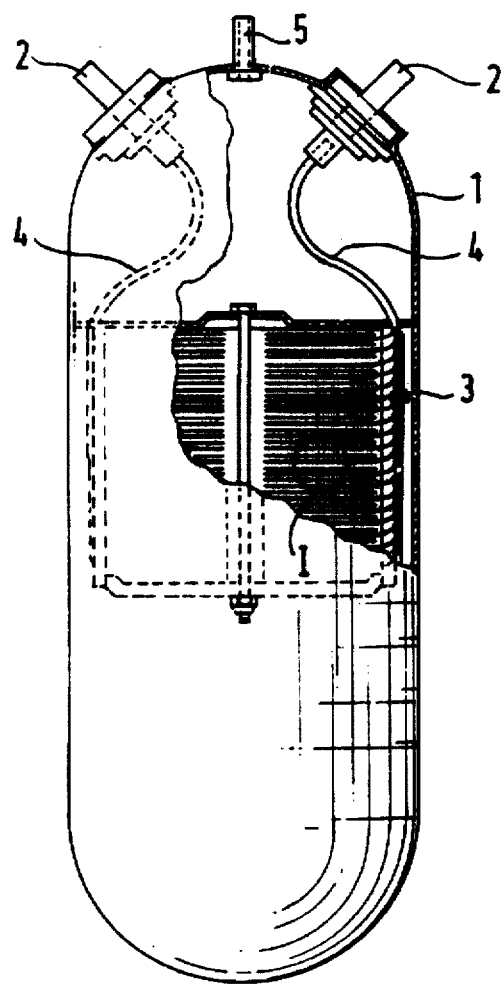
FIG. 1 shows a nickel hydrogen storage cell of the invention.
Figure 2:
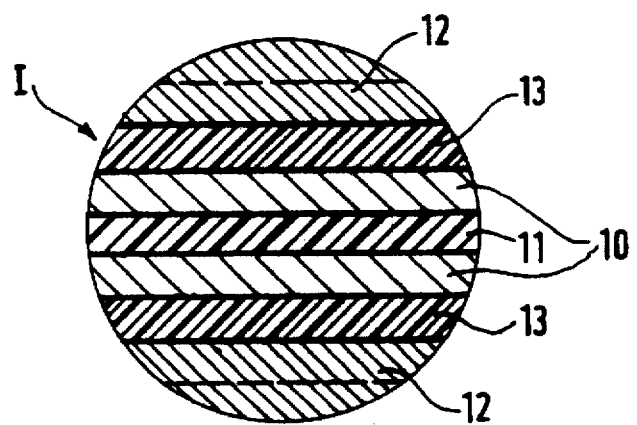
FIG. 2 is a detail of portion I of the electrochemical stack, showing how the electrodes are stacked.

An electrochemical cell of the present invention is shown in FIG. 1. It comprises a container 1 having hemispherical ends that withstand pressure and provided with two electrical outlet terminals 2. The electrochemical stack 3 is placed inside the container, with the electrodes of each polarity being connected to their respective terminal 2 by connections 4. A tube 5 allows hydrogen to be injected and allows the storage cell to be filled with electrolyte prior to being closed. FIG. 2 shows a detail of the stack of electrodes. The negative electrodes 10 are associated in back-to-back pairs being separated by spacers 11 giving access to hydrogen. The negative electrodes 10 and the positive electrodes 12 are separated by separators 13.

The porous support for the positive electrodes comprises a perforated nickel-plated foil on which nickel powder has been sintered. The active material constituted by nickel hydroxide containing about 5% cobalt hydroxide was impregnated electrochemically into the pores of the support at a concentration of about 14 grams per square decimeter (g/dm$^2$) of electrode. Thereafter, the electrode was plunged into a solution of cobalt acetate at a concentration of 70 grams per liter (g/l) maintained at 55° C. for a period of 7 minutes. Suction of 450 mm of Hg was imposed on the air situated above the solution. The electrode was drip-dried, rinsed in deionized water, and dried at 120° C. for 20 minutes. Thereafter the electrode was immersed in a solution of caustic soda at a concentration of 250 g/l maintained at 40° C. ±2° C. for a period of 30 min ±5 min. The electrode was then rinsed in hot water (80° C.) for 10 minutes and dried at 60° C. overnight. The above method deposited 0.56 g/dm$^2$ to 0.74 g/dm$^2$ of cobalt hydroxide.

Electrodes manufactured in the above-described manner were used for making the storage cell of the present invention as shown in FIG. 1. After inserting 7.3 N KOH electrolyte, and prior to closing the said storage cell, gaseous hydrogen was injected until a pressure was achieved such that the hydrogen pressure at the end of discharge was zero and the positive electrodes could not be fully discharged, maintaining 2% to 10% of their initial capacity.

The storage cell was then subjected to five cycles under the following conditions, where C designates the nominal capacity of the storage cell, which in particular was 51.8 Ah:

|         | Charge            | Discharge                                |
|---------|-------------------|------------------------------------------|
| cycle 1 | C/10 for 14 hours | C/5 down to 1 volt                       |
| cycle 2 | C/10 for 14 hours | C/5 down to 1 volt + C/10 down to 0.8 volts |
| cycle 3 | C/10 for 14.5 hours | C/2 down to 1 volt + C/5 down to 0.8 volts |
| cycle 4 | C/5 for 7 hours   | C/2 down to 1 volt + C/5 down to 0.8 volts |
| cycle 5 | C/5 for 7 hours   | C/2 down to 1 volt + C/5 down to 0.8 volts |

By way of comparison, cycling under the same conditions was applied to a storage cell that was analogous, except that the ratio of the capacities of its positive and negative electrodes was less than 1 and its positive electrodes were manufactured by the prior art method with no cobalt being deposited.

Figure 3:
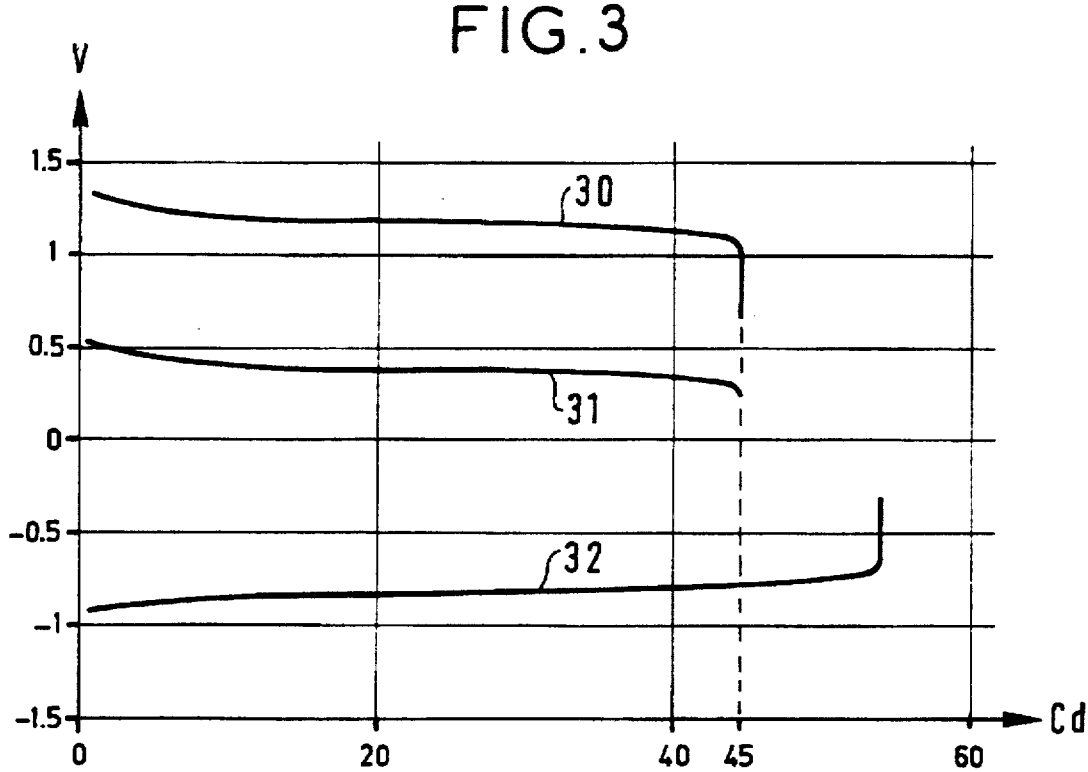
FIG. 3 applies to a prior art storage cell and is a graph showing how voltage and hydrogen pressure vary during discharge, starting from the third cycle.

FIG. 3 shows the discharge curve of that storage cell. It can be seen that when the positive electrode (curve 31) was completely discharged, storage cell discharge (curve 30) was terminated while the negative electrode (curve 32) still possessed excess available capacity. At the end of discharge, hydrogen pressure was greater than 1 bar.

Figure 4:
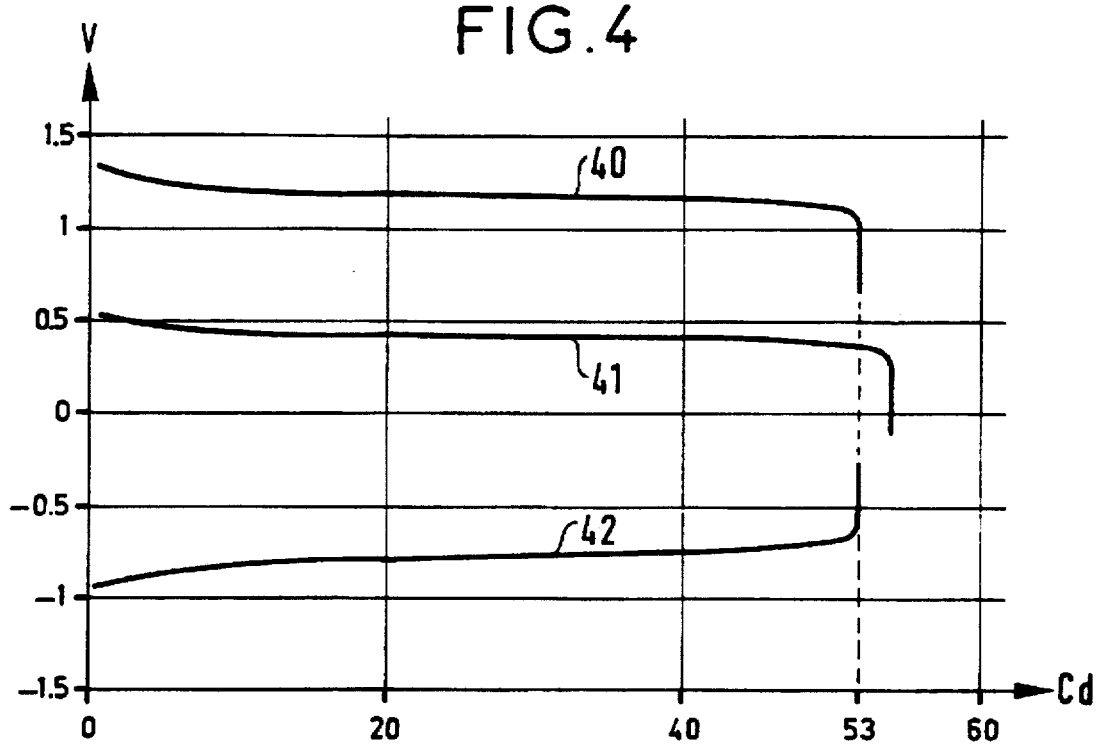
FIG. 4 is analogous to FIG. 3, but applies to a storage cell of the invention.

In the present invention (FIG. 4), storage cell discharge terminated (curve 40) when the negative electrode (curve 42) was discharged. Hydrogen pressure was zero. A fraction of the capacity of the positive electrode (curve 41) had not been discharged, i.e. constituted the excess of positive capacity.

The values of discharged capacity (in Ah) as measured at 1 volt on the storage cell of the invention and on the prior art storage cell are summarized in the following table:

TABLE

| Cycle | Invention | Prior art | Improvement % |
|-------|-----------|-----------|---------------|
| 1     | 50.7      |           |               |
| 2     | 50.96     | 43.29     | 17.72         |
| 3     | 50.7      | 43.01     | 17.88         |
| 4     | 52.26     | 45.53     | 14.78         |
| 5     | 53.3      | 45.2      | 17.92         |
| 27    | 53.4      | 45.4      | 17.7          |

The present invention thus provides an improvement of 18% on capacity discharged by the storage cell compared with the prior art, which improvement is retained well beyond the first cycle. The energy density per unit mass of the storage cell of the invention associated with this improvement is 65 Wh/kg to 70 Wh/kg.

Naturally the present invention is not limited to the embodiment described, but can be modified in numerous ways by the person skilled in the art without going beyond the ambit of the invention.

I claim:

1. A nickel hydrogen storage cell comprising at least one negative electrode providing a negative capacity and at least one positive electrode providing a positive capacity, the electrochemically active material of said at least one positive electrode containing a majority of nickel hydroxide being deposited electrochemically in the pores of a three-dimensional porous conductive support, wherein the ratio of said positive capacity over said negative capacity lies in the range 1.02 to 1.10, said active material of said at least one positive electrode being covered in cobalt hydroxide after said deposition.

2. A method of making a nickel hydrogen storage cell comprising at least one negative electrode providing a negative capacity and at least one positive electrode providing a positive capacity, the electrochemically active material of said at least one positive electrode containing a majority of nickel hydroxide being deposited electrochemically in the pores of a three-dimensional porous conductive support, wherein the ratio of said positive capacity over said negative capacity lies in the range 1.02 to 1.10, said active material of said at least one positive electrode being covered in cobalt hydroxide after said deposition, in which said cobalt hydroxide is deposited on the active material in a manner comprising the following steps:

a first step in which said electrode is immersed in a solution of cobalt salt and then dried and surface-rinsed in water; and a second step in which said electrode is immersed in a solution of caustic soda and then washed in water and dried.

3. A method of making a nickel hydrogen storage cell according to claim 2, in which said cobalt salt is selected from acetate, nitrate, and sulfate.

4. A method of making a nickel hydrogen storage cell according to claim 2, including the following steps prior to closing said storage cell:

said at least one positive electrode is fully discharged and then charged partially providing hydrogen evolution on said at least one negative electrode, at least a part of the volume of evolved hydrogen is allowed to be expelled from said storage cell, said volume corresponding to the positive capacity excess.

* * * * *